United States Patent
Antich

(10) Patent No.: US 12,035,649 B2
(45) Date of Patent: Jul. 16, 2024

(54) AGRICULTURAL VEHICLE WITH TRANSFERABLE SETTINGS AND SYSTEM FOR DETERMINING SUGGESTED SETTINGS FROM TRANSFERRED SETTINGS

(71) Applicant: CNH Industrial America LLC, New Holland, PA (US)

(72) Inventor: Ivan Antich, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 511 days.

(21) Appl. No.: 17/411,602

(22) Filed: Aug. 25, 2021

(65) Prior Publication Data
US 2023/0067106 A1    Mar. 2, 2023

(51) Int. Cl.
*A01B 71/02*    (2006.01)
*B60W 50/00*    (2006.01)
(Continued)

(52) U.S. Cl.
CPC ......... *A01B 71/02* (2013.01); *B60W 50/0098* (2013.01); *B60W 50/085* (2013.01); *H04L 67/306* (2013.01); *B60W 2050/0088* (2013.01); *B60W 2300/15* (2013.01); *B60W 2556/65* (2020.02)

(58) Field of Classification Search
CPC . A01B 71/02; B60W 50/0098; B60W 50/085; B60W 2050/0088; B60W 2300/15; B60W 2556/65; H04L 67/306; H04L 67/12
See application file for complete search history.

(56) References Cited

U.S. PATENT DOCUMENTS 7,283,902 B2   10/2007   Heider et al.
8,793,031 B2    7/2014   Anantha et al.
(Continued)

OTHER PUBLICATIONS

Li et al, M. Review of Research on Agricultural Vehicle Autonomous Guidance, Google Scholar, International Journal of Agricultural and Biological Engineering, vol. 2, No. 3, Sep. 2009, pp. 1-27. (Year: 2009).*

(Continued)

*Primary Examiner* — Russell Frejd
(74) *Attorney, Agent, or Firm* — Rickard K. DeMille; Rebecca L. Henkel; Peter K. Zacharias

(57) ABSTRACT

An agricultural vehicle includes: a chassis; at least one adjustable agricultural tool carried by the chassis and configured to function according to at least one operating parameter; and a controller operably coupled to the at least one adjustable agricultural tool. The controller is configured to: generate a user profile that includes at least one operating parameter setting corresponding to the at least one operating parameter; output the user profile to an external device; receive a modified user profile that includes at least one suggested parameter setting corresponding to at least one suggested operating parameter for at the least one adjustable agricultural tool; and cause adjustment of the at least one adjustable agricultural tool so the at least one adjustable agricultural tool functions according to the at least one suggested operating parameter.

17 Claims, 7 Drawing Sheets

(51) Int. Cl.
*B60W 50/08* (2020.01)
*H04L 67/306* (2022.01)

(56) References Cited

U.S. PATENT DOCUMENTS

| | | |
|---|---|---|
| 9,533,640 B2 | 1/2017 | Rai |
| 9,563,998 B2 | 2/2017 | Hoyos et al. |
| 9,643,619 B2 | 5/2017 | Sinaguinan |
| 10,099,637 B1 | 10/2018 | Akella et al. |
| 10,127,749 B2 | 11/2018 | Schmidt |
| 10,137,906 B2 | 11/2018 | Chen et al. |
| 10,210,761 B2 | 2/2019 | Rau et al. |
| 10,980,166 B2* | 4/2021 | Stanhope ............. A01C 21/005 |
| 2010/0287900 A1* | 11/2010 | Ringwald ............ A01D 41/141 56/28 |
| 2015/0088337 A1 | 3/2015 | Toohy et al. |
| 2016/0246526 A1 | 8/2016 | Ricci |
| 2017/0076396 A1 | 3/2017 | Sudak |
| 2017/0291562 A1 | 10/2017 | Gerlach |
| 2018/0188064 A1* | 7/2018 | Rivers .................. G01C 21/203 |
| 2018/0229674 A1 | 8/2018 | Heinrich et al. |
| 2020/0113122 A1* | 4/2020 | Pomedli ............... A01B 79/005 |
| 2020/0156470 A1* | 5/2020 | Stanhope ............. A01B 79/02 |
| 2021/0153420 A1* | 5/2021 | Smith .................. A01B 79/005 |
| 2021/0386009 A1* | 12/2021 | Engel .................... A01C 7/084 |

OTHER PUBLICATIONS

Bechar et al, A. Agricultural Robots for Field Operations: Concepts and Components, Google Scholar, ScienceDirect, Biosystems Engineering, 2016, pp. 94-111. (Year: 2016).*

* cited by examiner

| PLANTER SETTINGS | TRACTOR SETTINGS | |
|---|---|---|
| Seed Spacing: 6.0 inches ← 201A <br> Opening Disc Angle: 4.0 degrees ← 201B <br> Trench Depth: 2.5 inches ← 201C <br> Closing Wheel Pressure: 30 lbs ← 201D <br> <br> 200 | | |

| OP_PARAMETER_TYPE | SET_VALUE |
|---|---|
| SEED_SPACING | 6.0 in |
| OPEN_DISC_ANGLE | 4.0 deg |
| TRENCH_DEPTH | 2.5 in |
| CLOSE_WHEEL_PRESSURE | 30 lbs |

| USER_PREFERENCE | SETTING |
|---|---|
| CABIN_TEMP | 72 F |
| UI_STYLE | Default |
| RADIO_PRESET | 1120 AM; 1260 AM; 1340 AM |
| LIGHT_BRIGHTNESS | Medium |
| SAFETY_WARNINGS | Ring |

FIG. 3

| | OP_PARAMETER_TYPE | SUGGESTED_VALUE |
|---|---|---|
| 401A | SEED_SPACING | 6.0 in |
| 401B | OPEN_DISC_ANGLE | 4.0 deg |
| 401C | TRENCH_DEPTH | 2.3 in |
| 401D | CLOSE_WHEEL_PRESSURE | 30 lbs |
| | | |
| | USER_PREFERENCE | SETTING |
| 302A | CABIN_TEMP | 72 F |
| 302B | UI_COLOR | Default |
| 302C | RADIO_PRESET | 1120 AM; 1260 AM; 1340 AM |
| 302D | LIGHT_BRIGHTNESS | Medium |
| 302E | SAFETY_WARNINGS | Ring |

FIG. 4

AGRICULTURAL VEHICLE WITH TRANSFERABLE SETTINGS AND SYSTEM FOR DETERMINING SUGGESTED SETTINGS FROM TRANSFERRED SETTINGS

FIELD OF THE INVENTION

The present invention pertains to agricultural vehicles and, more specifically, to agricultural vehicles with adjustable settings.

BACKGROUND OF THE INVENTION

Many different types of agricultural vehicles are known for performing various agricultural functions. The various agricultural functions together, for example, prepare a field for planting crop material, plant crop material, and harvest crop material. While known agricultural vehicles are effective for such purposes, modern vehicles have many different adjustable settings that control operation of the vehicle and/or provide comfort for the user. The user's experience with any one vehicle may be detrimentally impacted by incorrect settings. Further, it is difficult for a user to know what setting(s) of an agricultural vehicle should be adjusted to get a desired result unless the user has extensive experience and/or data to utilize.

What is needed in the art is a way to address at least some of the previously described issues of known agricultural vehicles.

SUMMARY OF THE INVENTION

Exemplary embodiments disclosed herein provide an agricultural vehicle, an agricultural vehicle system, and a method that can adjust at least one agricultural tool according to at least one suggested operating parameter.

In some exemplary embodiments provided according to the present disclosure, an agricultural vehicle includes: a chassis; at least one adjustable agricultural tool carried by the chassis and configured to function according to at least one operating parameter; and a controller operably coupled to the at least one adjustable agricultural tool. The controller is configured to: generate a user profile that comprises at least one operating parameter setting corresponding to the at least one operating parameter; output the user profile to an external device; receive a modified user profile that includes at least one suggested parameter setting corresponding to at least one suggested operating parameter for at the least one adjustable agricultural tool; and cause adjustment of the at least one adjustable agricultural tool so the at least one adjustable agricultural tool functions according to the at least one suggested operating parameter.

In some exemplary embodiments provided according to the present disclosure, an agricultural vehicle system includes: a plurality of agricultural vehicles, each of the agricultural vehicles including: a chassis; at least one adjustable agricultural tool carried by the chassis and configured to function according to at least one operating parameter; and a vehicle controller operably coupled to the at least one adjustable agricultural tool, the vehicle controller being configured to: generate a user profile that includes at least one operating parameter setting corresponding to the at least one operating parameter; output the user profile to an external device; receive a modified user profile that includes at least one suggested parameter setting corresponding to at least one suggested operating parameter for at the least one adjustable agricultural tool; and cause adjustment of the at least one adjustable agricultural tool so the at least one adjustable agricultural tool functions according to the at least one suggested operating parameter; and a system controller configured to: receive the user profile from each of the plurality of agricultural vehicles; define the at least one suggested operating parameter setting by comparing the at least one operating parameter setting of each user profile to a result, determining which one of the parameter settings is correlated to a greatest result from the comparing, and defining the correlated parameter setting as the at least one suggested operating parameter setting; and output the at least one suggested parameter setting.

In some embodiments, a method of adjusting operation of vehicles is provided. The method includes: receiving a user profile from a plurality of agricultural vehicles, each of the user profiles including at least one operating parameter setting corresponding to at least one operating parameter of at least one adjustable agricultural tool of each agricultural vehicle; defining at least one suggested operating parameter setting by comparing the at least one operating parameter setting of each user profile to a result, determining which one of the parameter settings is correlated to a greatest result from the comparing, and defining the correlated parameter setting as the at least one suggested operating parameter setting; outputting the at least one suggested parameter setting to at least one of the agricultural vehicles; and adjusting the at least one adjustable agricultural tool of the at least one of the agricultural vehicles so the at least one adjustable agricultural tool of the at least one of the agricultural vehicles functions according to the output at least one suggested operating parameter.

One possible advantage that may be realized by exemplary embodiments disclosed herein is that a user can transfer settings between vehicles, either of the same vehicle type or different vehicle types, so the user does not need to remember what settings were used in each vehicle.

Another possible advantage that may be realized by exemplary embodiments disclosed herein is that the system can be used to determine what setting(s) gives the greatest result, which can then be used in the plurality of agricultural vehicles to improve function across the fleet of vehicles.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 2 illustrates an exemplary user interface (UI) that may be presented on a display of one of the agricultural vehicles of FIG. 1;

FIG. 3 illustrates an exemplary embodiment of a user profile provided according to the present disclosure;

FIG. 4 illustrates an exemplary embodiment of a modified user profile provided according to the present disclosure;

DETAILED DESCRIPTION OF THE INVENTION

Figure 1:
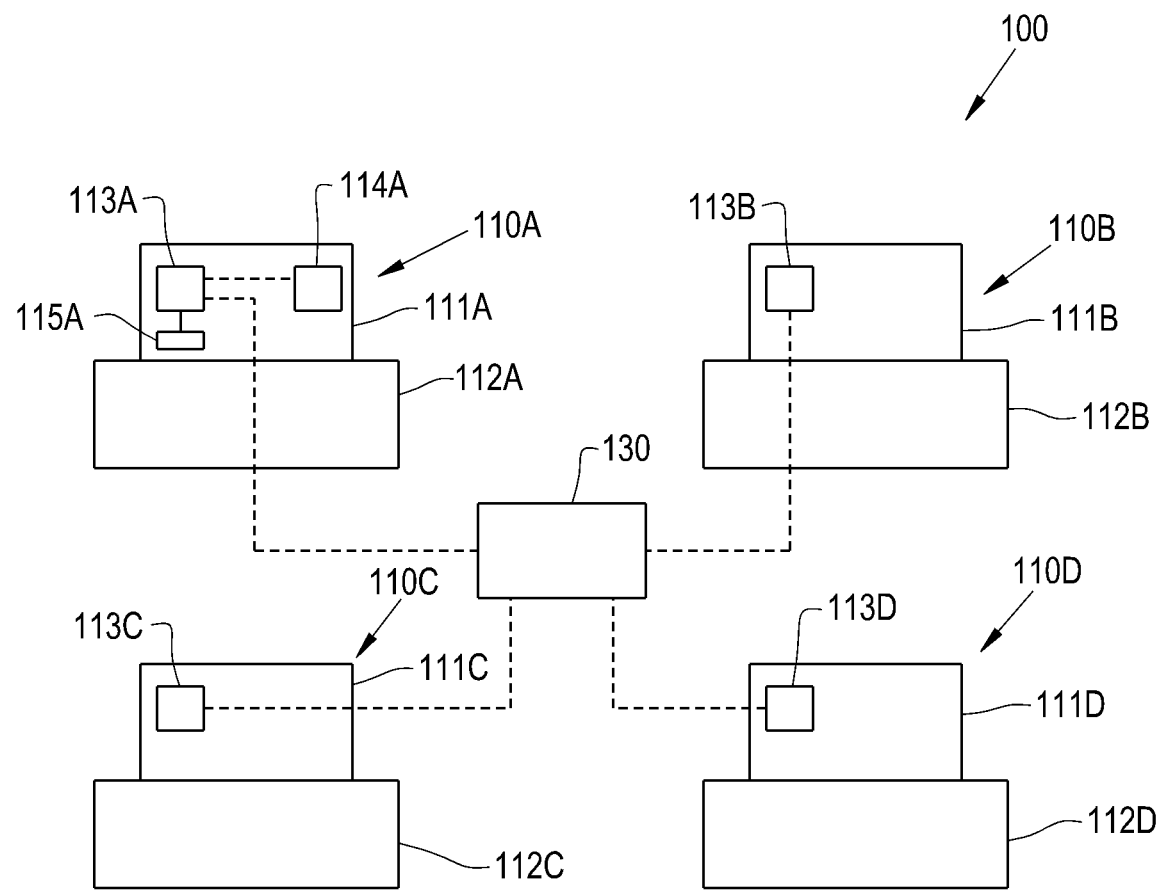
FIG. 1 illustrates a schematic view of an exemplary embodiment of an agricultural vehicle system including a plurality of agricultural vehicles, provided according to the present disclosure.

Referring now to the drawings, and more particular to FIG. 1, there is shown an agricultural vehicle system 100 that includes multiple agricultural vehicles, illustrated as four agricultural vehicles 110A, 110B, 110C, 110D. It should be appreciated that while the agricultural vehicle system 100 is illustrated and described as including four agricultural vehicles 110A, 110B, 110C, 110D, the agricultural vehicle system 100 may have fewer than four agricultural vehicles, e.g., two or three agricultural vehicles, or more than four agricultural vehicles, e.g., five, six, seven, or more agricultural vehicles. It should thus be appreciated that the agricultural vehicle system 100 provided according to the present disclosure can include different numbers of agricultural vehicles.

Each of the agricultural vehicles 110A, 110B, 110C, 110D includes a chassis 111A, 111B, 111C, 111D, at least one adjustable agricultural tool 112A, 112B, 112C, 112D carried by the chassis 111A, 111B, 111C, 111D, and a controller 113A, 113B, 113C, 113D, which may also be referred to as a "vehicle controller," operably coupled to the respective at least one agricultural tool 112A, 112B, 112C, 112D. Each of the agricultural tools 112A, 112B, 112C, 112D is configured to function according to at least one operating parameter. For example, if the agricultural vehicles 110A, 110B, 110C, 110D all include tractors and some or all of the agricultural tools, such as all of the agricultural tools 112A, 112B, 112C, 112D, are planters, some of the operating parameters that each of the agricultural tools 112A, 112B, 112C, 112D may be configured to function according to include, but are not limited to, a pattern of seed spread by the agricultural tools 112A, 112B, 112C, 112D a rate of seed spread by the agricultural tools 112A, 112B, 112C, 112D, etc. In some embodiments, all of the vehicles 110A, 110B, 110C, 110D are identical to one another, i.e., each of the vehicles 110A, 110B, 110C, 110D has substantially the same functional components, even if the functional components are not set to the same settings. Exemplary configurations for the agricultural vehicles include, but are not limited to: tractors; harvesters, such as combine harvesters, forage harvesters, fruit harvesters, etc.; self-propelled windrowers; self-propelled sprayers; etc. Similarly, exemplary configurations for the agricultural tools include, but are not limited to: headers, such as wheat headers or corn headers; balers, such as round balers or square balers; planters; spreaders; windrowers; sprayers; etc. It should thus be appreciated that while the agricultural vehicles 110A, 110B, 110C, 110D are described as being tractors and all of the agricultural tools 112A, 112B, 112C, 112D are previously described as planters, the agricultural vehicles and/or the agricultural tools provided according to the present disclosure can adopt a wide variety of different configurations.

Each of the agricultural vehicles 110A, 110B, 110C, 110D may be operated by one user or multiple users at different times. Regardless of whether it is one user or multiple users operating all of the agricultural vehicles 110A, 110B, 110C, 110D, the operating parameter(s) of each of the agricultural tools 112A, 112B, 112C, 112D may not be set for optimum performance. One or more of the agricultural tools 112A, 112B, 112C, 112D may be set to have an operating parameter setting that is not optimal and/or detrimental to the agricultural operation. For example, if the agricultural tools 112A, 112B, 112C, 112D are all planters, one or more of the agricultural tools 112A, 112B, 112C, 112D may be set to plant seeds too close together in a field during operation, which can detrimentally affect yield.

To address some of the previously described issues, one or more of the vehicle controllers 113A, 113B, 113C, 113D is configured to generate a user profile that includes at least one operating setting corresponding to the at least one operating parameter; output the user profile to an external device; receive a modified user profile that includes at least one suggested parameter setting corresponding to at least one suggested operating parameter for the at least one agricultural tool 112A, 112B, 112C, 112D; and cause adjustment of the at least one agricultural tool 112A, 112B, 112C, 112D so the at least one agricultural tool 112A, 112B, 112C, 112D functions according to the at least one suggested operating parameter. For ease of description, further description refers to only one of the vehicle controllers 113A of the agricultural vehicle 110A and the associated agricultural tool 112A, but it should be appreciated that the following description is equally applicable to any of the other vehicle controllers 113B, 113C, 113D of the other agricultural vehicles 110B, 110C, 110D.

Referring now to FIG. 2 as well, an exemplary embodiment of a user interface (UI) 200 that may be presented on a display 114A of the agricultural vehicle 110A is illustrated. As illustrated, the UI 200 presents several operating parameters 201A, 201B, 201C, 201D of the agricultural tool 112A. In the example of the agricultural tool 112A being a planter, some of the displayed operating parameters 201A, 201B, 201C, 201D include, but are not limited to, spacing between planted seeds 201A, opening disc angle 201B, trench depth 201C, and closing wheel down pressure 201D. The UI 200 may also present each of the displayed operating parameters 201A, 201B, 201C, 201D with an associated operating parameter setting, some or all of which may be adjustable by a user so the agricultural tool 112A functions according to the operating parameter setting. For example, a user may wish to increase the closing wheel down pressure 201D by setting the displayed value to an increased value. Upon the user entering the new value of the closing wheel down pressure 201D, the vehicle controller 113A can output one or more corresponding signals to one or more components of the agricultural tool 112A, such as a cylinder coupled to the closing wheel, to increase the closing wheel down pressure.

According to the present disclosure, the vehicle controller 113A is configured to generate a user profile that includes one or more of the parameter settings corresponding to one or more of the operating parameters 201A, 201B, 201C, 201D. In some embodiments, the vehicle controller 113A is configured to generate a user profile that includes all of the parameter settings so the user profile includes all of the parameter settings that correspond to how the agricultural tool 112A is functioning. In some embodiments, the user profile is generated as a table 300 (illustrated in FIG. 3) that includes the operating parameter(s). As illustrated in FIG. 3, for example, the user profile 300 may be generated to include columns 301A, 301B, with the column 301A defining a type of the operating parameter(s) 201A, 201B, 201C, 201D that is part of the user profile 300 and the column 301B defining the value of the operating parameter(s). As can be seen in comparing FIGS. 2 and 3, the user profile 300 of FIG. 3 is a tabular depiction of the displayed operating parameters 201A, 201B, 201C, 201D of the UI 200, which correspond to the operating parameters of the agricultural tool 112A. In some embodiments, the column 301A of the user profile 300 utilizes a plain-language description of the type of the operating parameter(s), but it should be appreciated that the column 301A can, alternatively, include alphanumeric codes rather than plain-language descriptions.

The vehicle controller 113A is configured to output the user profile 300 to an external device. The external device may be, for example, a system controller 130 (illustrated in FIG. 1) that is configured to receive user profiles from one or more agricultural vehicles, as will be described further herein. To output the user profile 300, the vehicle controller 113A may be operably coupled to a communication interface 115A of the agricultural vehicle 110A. The communication interface 115A may include one or more communication modules that allow communication between the vehicle controller 113A and an external device. The communication interface 115A may, for example, be configured to communicate wirelessly with an external device and/or include one or more ports for wired communication with an external device. The communication interface 115A may, for example, include a communication module to wirelessly communicate with an external device using a communication standard such as wireless fidelity (WiFi) or BLUETOOTH® and/or a communication module for wired communication with an external device via a port such as a universal serial bus (USB). The external device may be, for example: another agricultural vehicle, such as another one of the agricultural vehicles 110B, 110C, 110D; an external hard drive, such as a portable hard drive commonly known as a "thumb drive" or "fob" or a hard drive of an external device such as a smartphone; and/or an external network device, such as the previously described system controller 130 that is part of an external network and/or a network device that is accessed through the Internet ("the cloud"). It should thus be appreciated that the vehicle controller 113A can be configured in a variety of ways to output the user profile 300 to an external device.

The vehicle controller 113A is also configured to receive a modified user profile that includes at least one suggested parameter setting corresponding to at least one suggested operating parameter for the at least one agricultural tool 112A. The modified user profile may be received from an external device as well, which may be any of the previously described exemplary external devices. The modified user profile may be, for example, in the form of a table 400 (illustrated in FIG. 4) that is similar to the user profile 300 and includes at least one suggested parameter setting corresponding to at least one suggested operating parameter, illustrated as four suggested operating parameters 401A, 401B, 401C, 401D. The modified user profile 400 may include a column 402A that corresponds to the type of the suggested operating parameter(s) and a column 402B that corresponds to the value of the suggested operating parameter(s). As can be seen in comparing FIGS. 3 and 4, one of the suggested operating parameters 401C differs from the corresponding operating parameter 301C of the user profile 300. The modified user profile 400 may, for example, include manufacturer suggested operating parameters for the specific agricultural vehicle 110A, but also may be generated in other ways as will be described further herein.

The vehicle controller 113A is configured to cause adjustment of the agricultural tool 112A so the agricultural tool 112A functions according to the suggested operating parameter(s) 401A, 401B, 401C, 401D. In the example illustrated in FIGS. 3-4, the vehicle controller 113A may be configured to compare the suggested operating parameters 401A, 401B, 401C, 401D to the operating parameters 201A, 201B, 201C, 201D of the user profile 300 and determine that the suggested operating parameter 401C differs from the corresponding operating parameter 201C. The vehicle controller 113A may then output one or more signals to the agricultural tool 112A to cause adjustment of the agricultural tool 112A so the agricultural tool 112A functions according to the suggested operating parameter 401C, i.e., the vehicle controller 112A outputs one or more signals that cause the trench depth operating parameter 201C to be adjusted to the suggested trench depth operating parameter 401C. While the vehicle controller 113A is illustrated and described as causing adjustment of the operating parameter 201C, it should be appreciated that the vehicle controller 113A can be configured to cause adjustment of the agricultural tool 112A to function according to any of the suggested operating parameters 401A, 401B, 401C, 401D, with or without comparing the suggested operating parameters 401A, 401B, 401C, 401D to the operating parameters 201A, 201B, 201C, 201D of the user profile 300. It should be further appreciated that the vehicle controller 113A can be configured to cause adjustment of the agricultural tool 112A to function according to a plurality of the suggested operating parameters 401A, 401B, 401C, 401D. Even further, the parameter settings may correspond to multiple operating parameters for multiple adjustable agricultural tools, e.g., one of the operating parameters may be for a planter while another one of the operating parameters may be for a sprayer so the agricultural vehicle 110A can be used with multiple different agricultural tools without needing additional user profiles.

While the previously described operating parameters are directed towards a planter, it should be appreciated that the described operating parameters are exemplary only and many different types of operating parameters, for a planter or for a different type of agricultural tool, can be included in the user profile 300 according to the present disclosure. The operating parameter(s) included in the user profile 300 may also be for the agricultural vehicle, generally, rather than the agricultural tool(s), specifically, so the agricultural tool functions according to the operating parameter(s). Such exemplary operating parameters include, but are not limited to: automatic (autonomous) guidance parameters, including but not limited to a path that the agricultural vehicle follows during a task, vehicle speed, swath lines, headlands boundaries, steering characteristics, etc.; and/or hydraulic parameters, including but not limited to hydraulic fluid temperature, hydraulic fluid pressure, etc. It should thus be appreciated that the operating parameters and suggested operating parameters may be a large variety of different parameters that affect function of the agricultural tool(s) according to the present disclosure.

In some embodiments, the vehicle controller 113A is configured so the generated user profile 300 also includes at least one user preference setting corresponding to at least one user preference 302A, 302B, 302C, 302D, 302E. The user preference(s) 302A, 302B, 302C, 302D, 302E may correspond to settings of the agricultural vehicle 110A that control aspects related to user comfort and operation of the agricultural vehicle 110A but have minimal, if any, impact on the agricultural functions of the agricultural vehicle 110A. Exemplary user preference settings include, but are not limited to, a heating ventilation and air conditioning (HVAC) setting 302A, a user interface setting 302B, an entertainment setting 302C, a lighting setting 302D, and/or a safety setting 302E. Each of the settings 302A, 302B, 302C, 302D, 302E may correspond to one or more user preferences, for example: the HVAC setting 302A may correspond to a temperature of a cabin of the agricultural vehicle 110A; the user interface setting 302B may correspond to a color of the user interface 200 presented; the entertainment setting 302C may correspond to one or more radio frequency settings; the lighting setting 302D may correspond to a brightness of lights of the agricultural vehicle 110A; and the safety setting 302E may correspond to the manner of safety alerts being issued. It should thus be appreciated that the vehicle controller 113A may be configured to not only generate a user profile 300 that includes operating parameter settings that control agricultural function of the agricultural vehicle 110A, but also include user preference settings that a user may wish to transfer from one vehicle to another for convenience.

Figure 5:
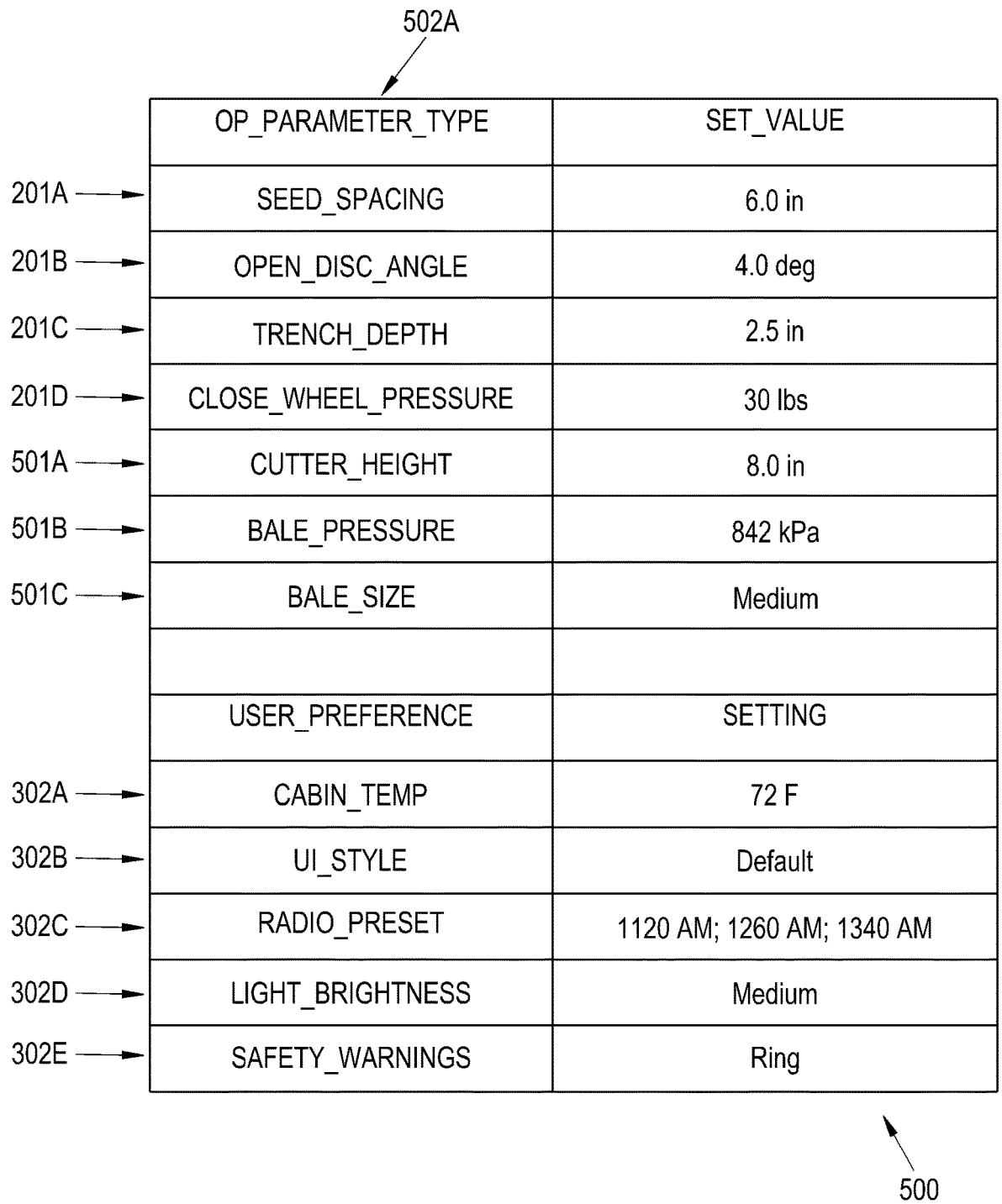
FIG. 5 illustrates another exemplary embodiment of a modified user profile provided according to the present disclosure.

In some embodiments, as will be described further herein, a modified user profile, such as the modified user profile 500 illustrated in FIG. 5, includes the operating parameters 201A, 201B, 201C, 201D of the user profile 300 as well as one or more settings 501A, 501B, 501C that are not applicable to the agricultural vehicle 113A. Such a modified user profile 500 may, for example, be a modified user profile 500 that is used across multiple agricultural vehicle types for the convenience of the user. In some embodiments, the vehicle controller 113A is configured to compare at least one setting type of the received modified user profile 500 to a plurality of possible agricultural vehicle setting types to identify at least one common setting type to, for example, planters, identify a setting associated with the at least one common setting type, and cause the agricultural vehicle 110A to be adjusted to the associated setting of the at least one common setting type. For example, the vehicle controller 110A may be configured to compare the operating parameters 201A, 201B, 201C, 201D and the settings 501A, 501B, 501C of the modified user profile 500 to a stored list of possible agricultural vehicle setting types to identify that the operating parameters 201A, 201B, 201C, 201D are common setting types, identify the setting associated with the common setting types 201A, 201B, 201C, 201D, and cause the agricultural vehicle 110A to be adjusted to associated setting of the common setting types 201A, 201B, 201C, 201D. The vehicle controller 110 may, for example, be configured to compare values in a column 502A, corresponding to the setting types of the modified user profile 500, to a list of possible agricultural vehicle setting types that are specific to the agricultural vehicle 110A, with the vehicle controller 113A identifying the common setting types as those in the column 502A that are also in the list of possible agricultural vehicle setting types. In this respect, the vehicle controller 113A can be configured to filter out settings and parameters from the modified user profile 500 that are not applicable to the agricultural vehicle 110A and only cause relevant adjustment(s) of the agricultural vehicle 110A.

From the foregoing, it should be appreciated that the vehicle controller(s) 113A, 113B, 113C, 113D provided according to the present disclosure allow the agricultural vehicles 110A, 110B, 110C, 110D to be adjusted according to suggested operating parameters. The suggested operating parameters may originate from, for example, the manufacturer of the agricultural vehicle(s) 110A, 110B, 110C, 110D and represent suggested parameters for getting desired results. The vehicle controller(s) 113A, 113B, 113C, 113D can also generate user profiles 300 that store various operating parameters and/or settings so a user can easily and conveniently adjust different vehicles according to the stored operating parameters and/or settings, reducing the amount of time that a user needs to be spend adjusting the vehicle before operation.

As previously described, the vehicle controllers 113A, 113B, 113C, 113D are configured to receive a modified user profile that includes at least one suggested parameter setting. As previously described, the modified user profile with the suggested parameter setting(s) can come from the manufacturer of the agricultural vehicles 110A, 110B, 110C, 110D. In some instances, it may be desired to generate a modified user profile utilizing data that comes from previous agricultural operations to correspond to recent conditions.

Figure 6:
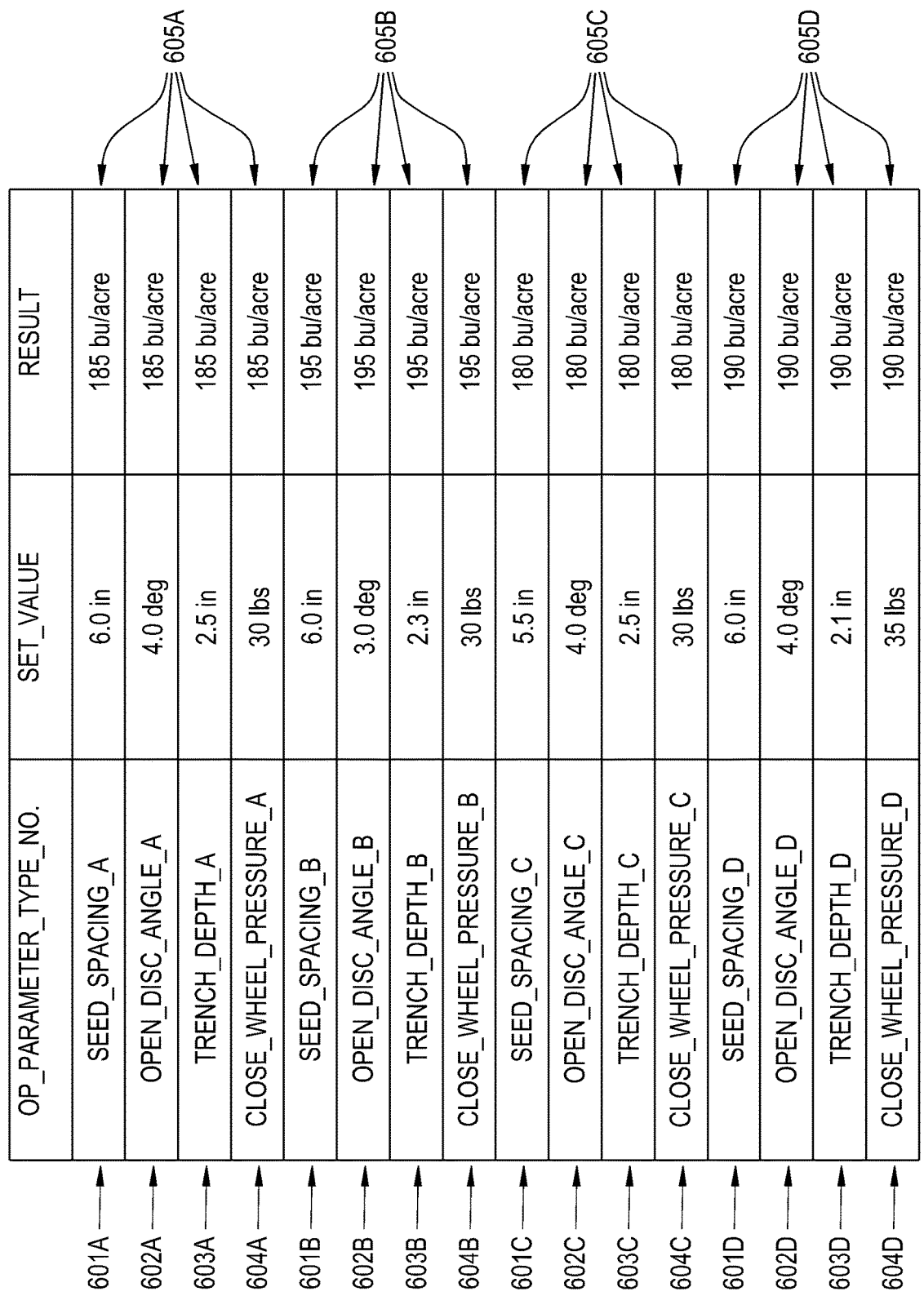
FIG. 6 illustrates an exemplary embodiment of a table that a system controller may utilize in defining one or more suggested operating parameters according to the present disclosure.

Referring still to FIG. 1, and referring now to FIG. 6 as well, a system controller 130 may be provided according to the present disclosure that is configured to output the at least one suggested parameter setting, which may be included in the modified user profile 400, 500. To output the suggested parameter setting(s), the system controller 130 is configured to receive a user profile from each of the agricultural vehicles 110A, 110B, 110C, 110D of the agricultural vehicle system 100, define the at least one suggested operating parameter setting by comparing the at least one setting of each user profile to a result, determining which one of the parameter settings is correlated to a greatest result from the comparing, and defining the correlated parameter setting as the at least one suggested operating parameter setting, and outputting the at least one suggested operating parameter setting. As illustrated in FIG. 6, the system controller 130 may be configured to receive the user profiles from each of the agricultural vehicles 110A, 110B, 110C, 110D, via a communication interface or otherwise. The table of FIG. 6 illustrates a graphical representation of how the system controller 130 may store the user profile from each of the agricultural vehicles 110A, 110B, 110C, 110D, but it should be appreciated that the system controller 130 does not need to tabulate the user profiles according to the present disclosure.

As can be seen in FIG. 6, the user profile from each of the agricultural vehicles 110A, 110B, 110C, 110D includes one or more parameter settings 601A, 601B, 601C, 601D, 602A, 602B, 602C, 602D, 603A, 603B, 603C, 603D, 604A, 604B, 604C, 604D, as previously described. The system controller 130 may compare related parameter settings 601A, 601B, 601C, 601D, 602A, 602B, 602C, 602D, 603A, 603B, 603C, 603D, 604A, 604B, 604C, 604D to one or more results 605A, 605B, 605C, 605D to correlate a greatest result from the parameter settings 601A, 601B, 601C, 601D, 602A, 602B, 602C, 602D, 603A, 603B, 603C, 603D, 604A, 604B, 604C, 604D. For example, the system controller 130 may compare the parameter settings 603A, 603B, 603C, and 603D, which are related parameter settings 603A, 603B, 603C, 603D from the different agricultural vehicles 110A, 110B, 110C, 110D, to the results 605A, 605B, 605C, 605D and determine which one of the related parameter settings 603A, 603B, 603C, 603D is correlated to a greatest result. In the example illustrated in FIG. 6, it can be seen that the parameter setting 603B is correlated to the greatest result, i.e., the highest crop yield, and thus may represent the desired operating parameter for the agricultural vehicles 110A, 110B, 110C, 110D from the sample parameter settings 603A, 603B, 603C, 603D. The vehicle controller 130 may thus define the correlated parameter setting 603B to the suggested operating parameter and output the suggested operating parameter, i.e., the parameter setting 603B. The system controller 130 may define one or more other suggested operating parameters from the other parameter settings 601A, 601B, 601C, 601D, 602A, 602B, 602C, 602D, 604A, 604B, 604C, 604D included in the received user profiles. It should thus be appreciated that the system controller 130 may be used to define the suggested operating parameter(s) for the modified user profile 400, 500 based on results that are obtained from the agricultural vehicles 110A, 110B, 110C, 110D operating according to different operating parameters.

While the results 605A, 605B, 605C, 605D illustrated in FIG. 6 and described previously correspond to crop yield, it should be appreciated that the system controller 130 can be configured to determine which parameter setting is correlated to different greatest results by comparing the parameter settings to different types of results. Other exemplary results include, but are not limited to, fuel efficiency, task completion time, cost, profit, and vehicle uptime. The greatest result for fuel efficiency, for example, may correspond to the operating parameter that corresponds to a lowest fuel consumption during a certain task. Similarly, the greatest result for task completion time and cost may correspond to the lowest time and the lowest cost for a specific task. It should thus be appreciated that the "greatest result" can correspond to a maximum or a minimum value, depending on the context, according to the present disclosure. The results may be compiled in a variety of ways; for example, some of the results, such as yield and/or task completion time, may be compiled by an agricultural vehicle that is part of the agricultural vehicle system 100 while other results, such as cost and/or profit, may be input by a user or otherwise.

In some embodiments, the system controller 130 comprises an algorithm that is utilized to define the one or more suggested parameters. The algorithm may, for example, be utilized by the system controller 130 to determine which of the parameters corresponds to the greatest result by enabling the system controller 130 to calculate a probability that each of the parameter settings corresponds to the greatest result. As can be seen in FIG. 6, for example, the user profile from each of the agricultural vehicles 110A, 110B, 110C, 110D may not differ from the other user profiles by only one of the parameter settings 601A, 601B, 601C, 601D, 602A, 602B, 602C, 602D, 603A, 603B, 603C, 603D, 604A, 604B, 604C, 604D. In such an instance, the system controller 130 may utilize an algorithm to perform statistical analysis of the parameter settings 601A, 601B, 601C, 601D, 602A, 602B, 602C, 602D, 603A, 603B, 603C, 603D, 604A, 604B, 604C, 604D to determine the likelihood that each parameter setting corresponds to the greatest result and correlate the parameter setting with the highest probability to the greatest result. In some embodiments, the system controller 130 may utilize an algorithm that takes into account previous performance of one or more of the agricultural vehicles 110A, 110B, 110C, 110D, e.g., user profiles and results from one or more of the agricultural vehicles 110A, 110B, 110C, 110D from one or more previous years, to determine what parameter setting(s) are correlated to a greatest result. The utilized algorithm may also be built to incorporate machine learning or similar techniques so the algorithm improves itself as more data, e.g., parameter settings and associated results, becomes available. In this respect, the system controller 130 can continuously update the one or more suggested parameter settings based on historic data and/or newly acquired data to determine parameter settings that can optimize performance of the agricultural vehicles 110A, 110B, 110C, 110D. It should thus be appreciated that the system controller 130 provided according to the present disclosure can utilize a variety of techniques for determining one or more suggested parameter settings from the user profiles and other data.

From the foregoing, it should be appreciated that the agricultural vehicle system 100 provided according to the present disclosure includes a system controller 130 that can define the suggested operating parameter setting(s) by comparing operating parameter settings to a result and determining which one of the operating parameter settings is correlated to a greatest result. Thus, the system controller 130 can be used to provide one or more suggested operating parameter settings that may optimize various functions of the agricultural vehicles 110A, 110B, 110C, 110D based on previously collected data.

Figure 7:
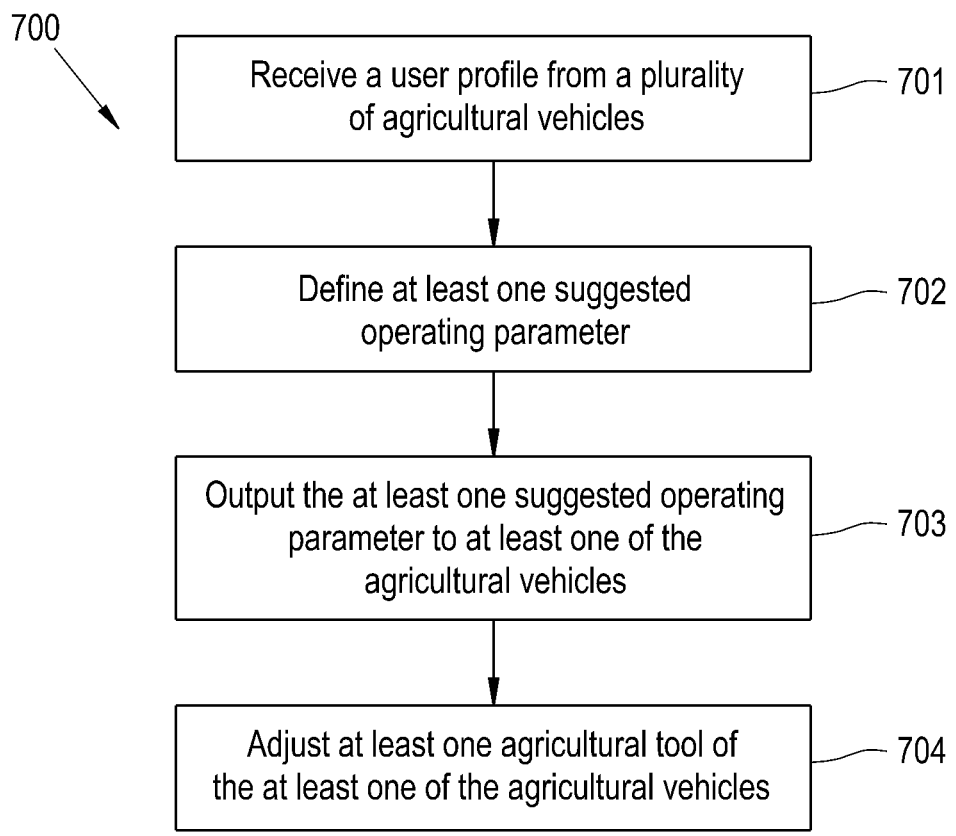
FIG. 7 illustrates an exemplary embodiment of a method of controlling agricultural vehicles according to the present disclosure.

Referring now to FIG. 7, an exemplary embodiment of a method 700 of adjusting operation of vehicles, such as the previously described agricultural vehicles 110A, 110B, 110C, 110D of the agricultural vehicle system 100, is provided. The method 700 includes receiving 701 a user profile 300 from a plurality of agricultural vehicles 110A, 110B, 110C, 110D, each of the user profiles 300 including at least one operating parameter setting corresponding to at least one operating parameter of at least one adjustable agricultural tool 112A, 112B, 112C, 112D of each agricultural vehicle 110A, 110B, 110C, 110D; defining 702 at least one suggested operating parameter by comparing at least one operating parameter setting of each user profile 300 to a result 605A, 605B, 605C, 605D, determining which one of the operating parameter settings is correlated to a greatest result from the comparing, and defining the correlated parameter setting to the at least one suggested operating parameter; outputting 703 the at least one suggested operator parameter setting to at least one of the agricultural vehicles 110A, 110B, 110C, 110D; and adjusting 704 the at least one agricultural tool 112A, 112B, 112C, 112D of the at agricultural vehicle(s) 110A, 110B, 110C, 110D so the agricultural tool(s) 112A, 112B, 112C, 112D of the agricultural vehicle (s) 110A, 110B, 110C, 110D functions according to the output suggested operating parameter(s). The method 700 may be performed, partially or wholly, by the vehicle controllers 113A, 113B, 113C, 113D and/or the system controller 130. The method 700 may also further include any of the previously described functionality of any one of the vehicle controllers 113A, 113B, 113C, 113D and/or the system controller 130.

It is to be understood that the steps of the method 700 are performed by one or more of the previously described controllers 113A, 113B, 113C, 113D, 130 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller(s) 113A, 113B, 113C, 113D, 130 described herein, such as the method 700, is implemented in software code or instructions which are tangibly stored on a tangible computer readable medium. The controller(s) 113A, 113B, 113C, 113D, 130 loads the software code or instructions via a direct interface with the computer readable medium or via a wired and/or wireless network. Upon loading and executing such software code or instructions by the controller(s) 113A, 113B, 113C, 113D, 130, the controller(s) 113A, 113B, 113C, 113D, 130 may perform any of the functionality of the controller(s) 113A, 113B, 113C, 113D, 130 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural vehicle, comprising:
a chassis;
at least one adjustable agricultural tool carried by the chassis and configured to function according to at least one operating parameter; and
a controller operably coupled to the at least one adjustable agricultural tool, the controller being configured to:
generate a user profile that comprises at least one operating parameter setting corresponding to the at least one operating parameter;
output the user profile to an external device;
receive a modified user profile that comprises at least one suggested parameter setting corresponding to at least one suggested operating parameter for the at least one adjustable agricultural tool; and
cause adjustment of the at least one adjustable agricultural tool so the at least one adjustable agricultural tool functions according to the at least one suggested operating parameter.

2. The agricultural vehicle of claim 1, wherein the controller is configured so the generated user profile further comprises at least one user preference setting corresponding to at least one user preference.

3. The agricultural vehicle of claim 2, wherein the at least one user preference setting corresponds to at least one of a heating ventilation and air conditioning setting, a user interface setting, an entertainment setting, a lighting setting, or a safety setting.

4. The agricultural vehicle of claim 1, wherein the controller is configured to compare at least one setting type of the received modified user profile to a plurality of possible agricultural vehicle setting types to identify at least one common setting type, identify a setting associated with the at least one common setting type, and cause the agricultural vehicle to be adjusted to the associated setting of the at least one common setting type.

5. The agricultural vehicle of claim 1, wherein the external device is at least one of another agricultural vehicle, an external hard drive, or an external network device.

6. The agricultural vehicle of claim 1, wherein the controller is configured to receive a modified user profile that comprises a plurality of parameter settings corresponding to a plurality of operating parameters for the at least one adjustable agricultural tool.

7. The agricultural vehicle of claim 6, wherein the plurality of parameter settings correspond to a plurality of operating parameters for a plurality of adjustable agricultural tools.

8. An agricultural vehicle system, comprising:
a plurality of agricultural vehicles, each of the agricultural vehicles comprising:
a chassis;
at least one adjustable agricultural tool carried by the chassis and configured to function according to at least one operating parameter; and
a vehicle controller operably coupled to the at least one adjustable agricultural tool, the vehicle controller being configured to:
generate a user profile that comprises at least one operating parameter setting corresponding to the at least one operating parameter;
output the user profile to an external device;
receive a modified user profile that comprises at least one suggested parameter setting corresponding to at least one suggested operating parameter for the at least one adjustable agricultural tool; and
cause adjustment of the at least one adjustable agricultural tool so the at least one adjustable agricultural tool functions according to the at least one suggested operating parameter; and
a system controller configured to:
receive the user profile from each of the plurality of agricultural vehicles;
define the at least one suggested operating parameter setting by comparing the at least one operating parameter setting of each user profile to a result, determining which one of the parameter settings is correlated to a greatest result from the comparing, and defining the correlated parameter setting as the at least one suggested operating parameter setting; and
output the at least one suggested parameter setting.

9. The agricultural vehicle system of claim 8, wherein the plurality of agricultural vehicles are identical to one another.

10. The agricultural vehicle system of claim 8, wherein the result comprises at least one of fuel efficiency, crop material yield, task completion time, cost, and profit.

11. The agricultural vehicle system of claim 8, wherein the controller is configured so the generated user profile further comprises at least one user preference setting corresponding to at least one user preference.

12. The agricultural vehicle system of claim 11, wherein the at least one user preference setting corresponds to at least one of a heating ventilation and air conditioning setting, a user interface setting, an entertainment setting, a lighting setting, or a safety setting.

13. The agricultural vehicle system of claim 8, wherein the system controller is part of an external network.

14. The agricultural vehicle system of claim 8, wherein the vehicle controller of each of the agricultural vehicles is configured to compare at least one setting type of the received modified user profile to a plurality of possible agricultural vehicle setting types to identify at least one common setting type, identify a setting associated with the at least one common setting type, and cause the respective agricultural vehicle to be adjusted to the associated setting of the at least one common setting type.

15. The agricultural vehicle system of claim 8, wherein the vehicle controller of at least one of the agricultural vehicles is configured to receive a modified user profile that comprises a plurality of parameter settings corresponding to a plurality of operating parameters for the at least one adjustable agricultural tool.

16. The agricultural vehicle system of claim 15, wherein the plurality of parameter settings corresponds to a plurality of operating parameters for a plurality of adjustable agricultural tools.

17. A method of adjusting operation of vehicles, the method comprising:
- receiving a user profile from a plurality of agricultural vehicles, each of the user profiles comprising at least one operating parameter setting corresponding to at least one operating parameter of at least one adjustable agricultural tool of each agricultural vehicle;
- defining at least one suggested operating parameter setting by comparing the at least one operating parameter setting of each user profile to a result, determining which one of the parameter settings is correlated to a greatest result from the comparing, and defining the correlated parameter setting as the at least one suggested operating parameter setting;
- outputting the at least one suggested parameter setting to at least one of the agricultural vehicles; and
- adjusting the at least one adjustable agricultural tool of the at least one of the agricultural vehicles so the at least one adjustable agricultural tool of the at least one of the agricultural vehicles functions according to the output at least one suggested operating parameter.

* * * * *